S. Hart,
Lasting Machine,
N° 4,587. Patented June 20, 1846.
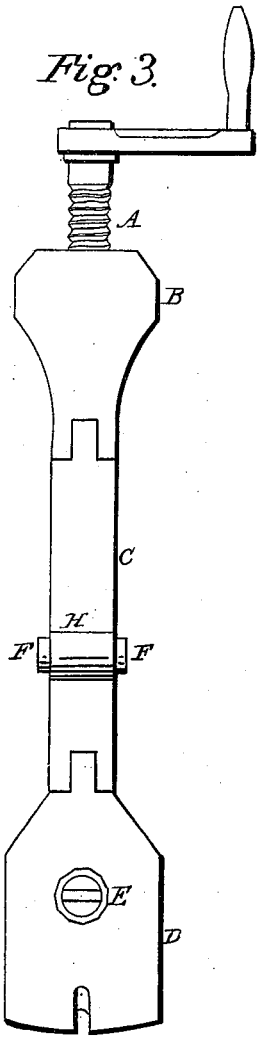
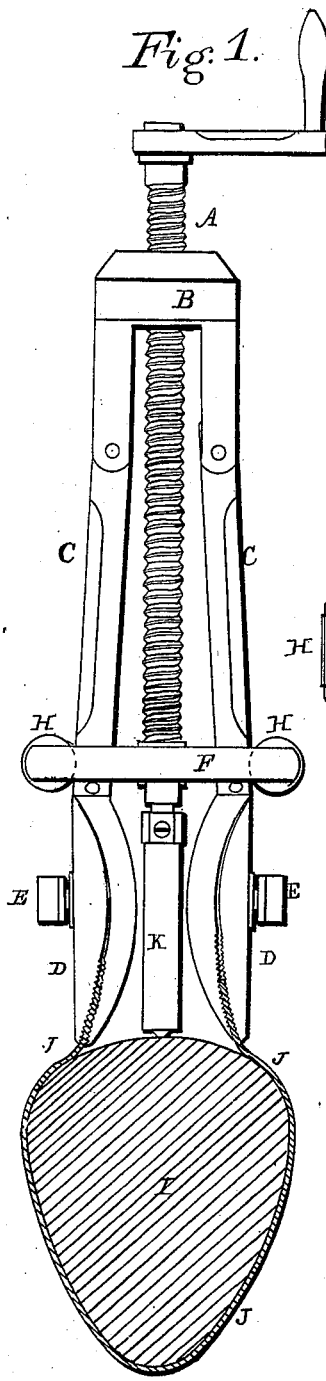
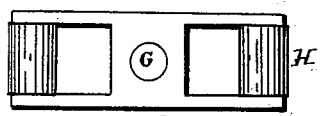
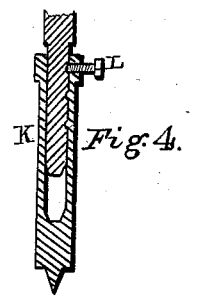

UNITED STATES PATENT OFFICE.

SILAS HART, OF NEW HAVEN, NEW YORK.

MACHINE FOR LASTING SHOES AND BOOTS.

Specification of Letters Patent No. 4,587, dated June 20, 1846.

*To all whom it may concern:*

Be it known that I, SILAS HART, of New Haven, in the county of Oswego and State of New York, have invented a new and useful Improvement in Machines for Lasting Boots and Shoes, which is described as follows, reference being had to the annexed drawings of the same, making part of this specification.

Figure 1 is a plan of the machine. Fig. 2 is a plan of the slide detached from the arms and screw. Fig. 3 is a view of one of the arms and jaws. Fig. 4, section of the extension tube.

The nature of this invention and improvement consists in contracting and expanding the arms containing the jaws for gripping the edges of the upper of the boot or shoe, by means of a slide that embraces or encircles the arms, said arms being moved toward or from the last simultaneously with the operation of turning the male screw in a female screw in the center of the nut to which they are connected by which the angle of the arms with the screw is diminished in lasting the upper and increased in unlasting it by reversing the operation of the screw, thus removing the objections existing in the use of the machine where the arms are expanded and contracted by a separate screw arranged at right angles to the main screw, and possessing the advantage of drawing the edges of the leather inward toward the shank and outward toward the slide simultaneously at the single operation of turning the screw against the last.

A is the main screw turned against the last by means of a crank handle or other means. B the nut to which the arms are attached. C C the arms. D D the jaws. E E the screws for closing the jaws. F the slide for contracting and expanding the arms. G a round opening in the center of the slide through which the round part of the screw-shaft passes. H H two antifriction rollers for reducing friction in the operation of the slide.

I is the last and J the upper or leather to be lasted.

K is a section of the screw-shaft made hollow and slipped over the shaft and made movable thereon for the purpose of lengthening and shortening the screw.

L is a screw for holding the tube at any desired position on the shaft.

The slide is a piece of metal containing a round opening in the center thereof corresponding with the cylindrical portion of the male screw made to turn therein. It also contains two openings to admit the arms which are inserted therein, each opening containing an antifriction roller. The slide is connected to the cylindrical part of the screw-shaft by collars and pins and remains stationary during the operation of drawing the arms through the openings therein.

Operation: Turn the screw to the left until the nut to which the arms are jointed is near the slide, which at the same time expand the arms; then bring the leather over the last and insert the edges in the jaws and secure them by the screws of the jaws. Turn the screw to the right. This operation will cause the nut and arms to recede from the last and bring the arms against the rollers in the slide causing the arms to close toward the screw; at the same time drawing the leather around the last, the power increasing as the angle decreases of the arms with the screw until they are nearly parallel with the screw. To unlast the upper it is only necessary to reverse the motion of the screw which also reverses the motion of the nut and arms.

The upper can be lasted more effectually and more expeditiously with this machine than by any other known means, one operation being all that is necessary after the leather is secured by the jaws and the screw is adjusted.

What I claim as my invention and desire to secure by Letters Patent is—

1. Combining the screw and slide with the jaws in the manner and for the purpose described.

2. I also claim the movable section K in combination with the screw as described.

SILAS HART.

Witnesses:
WM. P. ELLIOT,
ALBERT E. H. JOHNSON.